พ3,809,666
Patented May 7, 1974

3,809,666
COMPOSITIONS OF POLYMERIC MATERIALS
Orest Nicholas Chick, Sarnia, Ontario, and Graham Neville Means, Petrolia, Ontario, Canada, assignors to Polymer Corporation Limited, Sarnia, Ontario, Canada
No Drawing. Continuation-in-part of application Ser. No. 204,762, Dec. 3, 1971. This application Nov. 17, 1972, Ser. No. 307,407
Int. Cl. C08d 7/00
U.S. Cl. 260—29.7 D  6 Claims

ABSTRACT OF THE DISCLOSURE

Improved paper coating compositions may be prepared when the latex used therein comprises a blend of a minor proportion by dry weight basis of a latex of a resinous copolymer with a major proportion by dry weight basis of a latex of a polymer consisting of at least four monomer units, namely, a conjugated diolefin and an alkenyl aromatic constituting 90–99.8% by weight of the copolymer and a carboxylic acid comonomer together with acrolein or methacrolein constituting 0.2 to 10 weight percent.

---

This application is a continuation-in-part of copending application Ser. No. 204,762 filed Dec. 3, 1971, and now abandoned.

This invention relates to latex-bonded fibre-containing compositions. More particularly, it relates to improved coated papers suitable for printing purposes.

The manufacture of coated papers suitable for printing has long been practiced. However changes in the printing industry have resulted in modifications in the property requirements of such paper; typical of such changes is the advent of web off-set printing. Many conflicting properties are sought in coated paper intended for such use, for example, good adherence of the coating to the fibres (particularly with the increased speed of printing in the web offset process), good ink receptivity, yet sufficient porosity such as will enable the printed paper to be rapidly dried without blistering.

It is an object of this invention to provide a latex composition for preparing an improved paper coating. Another object is to provide a coated paper having in combination good porosity to permit rapid drying without blistering and resistance to "picking" during the printing operation. The term "picking" will be later described herein.

It has now been found that improved paper coating compositions may be prepared from a latex composition comprising a mixture of: (A) 10–40 parts on a dry weight basis of an aqueous latex of a copolymer prepared from a monomer mixture comprising (1) 30–15 weight percent of an acyclic conjugated diolefin monomer, (2) 70–85 weight percent of a monoolefinically unsaturated copolymerizable monomer free of carbonyl structures and (3) 0–10 weight percent of an olefinically unsaturated carboxylic acid; (B) 90–60 parts on a dry weight basis of an aqueous latex of a copolymer prepared from a monomer mixture comprising (1) 0.1–5 weight percent of an olefinically-unsaturated carboxylic acid, (2) 0.1–5 weight percent of an olefinically unsaturated carbonyl compound, (3) 90–99.8 weight percent of monomers composed of 60–30 parts of an acyclic conjugated diolefin monomer and 40–70 parts of a monoolefinically unsaturated copolymerizable monomer free of carbonyl structures.

The invention also provides an improved coated paper whenever prepared from the latex mixture defined herein.

LATEX A

The conjugated diolefin monomer used to prepare the copolymer of latex A is an acyclic diene having from 4 to 8 carbon atoms as a butadiene-1,3, for example, butadiene-1,3 isoprene, chloroprene and 2,3-dimethylbutadiene-1,3, of which butadiene-1,3 is prefered. The monoolefinically-unsaturated copolymerizable compound free of carbonyl structures may be an alkenyl aromatic compound such as a styrene or a substituted styrene monomer, e.g. alpha-methyl styrene and alpha-chlorostyrene and vinyl toluene with styrene being a particularly useful copolymerizable compound. The benefits to be found within the present concept require that the copolymer of latex A contain 30–15 and preferably 25–20 parts by weight of polymerized diolefin and correspondingly 70–85 and preferably 75–80 parts by weight of the carbonyl-free monomer; that is to say, the copolymer of latex A must be resinous in nature yet comprise sufficient of the diene moiety which normally forms rubbery polymers to provide a balance of properties. In a preferred embodiment, the copolymer of latex A further comprises units of an olefinically unsaturated carboxylic acid comonomer in the amount of up to 10 weight percent of the copolymer, usually from 1–5 weight percent. Suitable carboxylic acid monomers include those selected from the groups consisting of (a) unsaturated carboxylic acids containing 3–5 carbon atoms, (b) cinnamic acid, and (c) mixtures of (a) and (b), examples of which are acrylic acid, ethacrylic acid, methacrylic acid, itaconic acid, cinnamic acid and mixtures thereof. When the ethylenically unsaturated carboxylic acid monomer units are present they replace a like amount of the carbonyl structure-free monomer.

LATEX B

As to latex B, the conjugated diolefin, the monoolefinically-unsaturated copolymerizable monomer free of carbonyl structures, and the ethylenically-unsaturated acid monomer used to prepare said latex B are each as defined above for latex A.

The olefinically-unsaturated carbonyl compound of the copolymer of latex B is a monomer having an olefinic group and a carbonyl group represented by the general formula: $H(R_1)C=C(R_2)-C(R_3)=O$ where $R_1$ is hydrogen or a hydrocarbon radical of 1–6 carbon atoms and $R_2$ and $R_3$ are hydrogen atoms or $C_1-C_2$ alkyl radicals. Representative examples of carbonyl compounds which can be used in this invention are acrolein, α-methyl acrolein, β-methyl acrolein, β-phenyl acrolein, methyl vinyl ketone as well as other alkyl vinyl ketones, and their mixtures. Acrolein is the preferred carbonyl compound.

The copolymer of latex B used in accordance with this invention consists of at least four monomer units. The first two monomers, the acyclic conjugated diolefin and the monoolefinically unsaturated carbonyl-free copolymerizable monomer, constitute a major part of the polymer, i.e. 90–99.8 parts per 100 parts by weight of polymer. The proportion of these two monomeric units may vary between 60–30 of diolefin to 40–70 of carbonyl-free monomer but the carbonyl-free monomer should be present in an amount of at least 40 parts per 100 parts by weight of polymer for use in this invention. The other two monomers of the copolymer of latex B, the carboxylic acid compound and the carbonyl compound, constitute a minor part of the polymer, i.e. a total of 0.2–10 parts per 100 parts by weight of polymer and preferably not more than 6 parts. The amount of carboxylic acid monomer may vary from about 0.1 to 5% by weight of total monomer but preferably is within the range of 1 to 5%, more preferably 1 to 3, particularly when the latex is to be used in paper coatings containing starch. The unsaturated carbonyl compound may be employed in an amount from 0.1 to 5% by weight of total monomer, although 1 to 5 parts are preferred, more preferably 1 to 3. The proportion of the carboxylic acid monomer to the carbonyl monomer may vary within wide limits but it is preferred to maintain it within the range of 3:1 to 1:3 on weight basis.

The polymerization reaction to prepare each of latices A and B is performed in an aqueous emulsion system employing a free radical initiator such as hydrogen peroxide, an alkali metal or ammonium persulphate, azobisisobutyronitrile or a redox initiator pair comprising a reducing compound and an organic peroxide as is well known in the polymerization art. Usually a fraction of a part per 100 parts monomers of a molecular weight regulator such as an alkyl mercaptan containing 8–22 C atoms or a mixture of such mercaptans is employed in the polymerization. The polymerization is carried out in an acidic aqueous medium using one or more synthetic emulsifiers capable of supporting polymerization in an acidic aqueous medium and capable of maintaining a stable dispersion of the copolymer in both acidic and alkaline mediums; such emulsifiers are known in the art and include various alkyl and alkylaryl sulfonates and polyether sulfates; the amount of emulsifier may vary but is usually about 1 to 3 parts per 100 parts of monomers. Once the acid monomer is incorporated as part of the copolymer, the resulting latex emulsion may be converted to an alkaline pH. The total of the ingredients used in the emulsion polymerization may be added either before the reaction is initiated or part may be incrementally introduced during the reaction. It is preferred to charge initially a portion of the monomer mixture and a portion of the aqueous phase and then add the remainder of these ingredients after the polymerization has been initiated.

The temperature of polymerization may vary as known in the emulsion polymerization art but preferably is between 10° to 80° C. The polymerization is usually conducted to a high degree of conversion of monomers to polymer but it may also be convenient to stop the reaction when 40–65% latex solids are reached and then remove the excess monomer. For most uses, the pH of each latex is adjusted after polymerization from acid, e.g. a pH of 2–6 to alkaline, e.g. a pH of about 7–11.

To prepare the mixture of latices A and B according to this invention, the relative proportion should be chosen so that the mixture contains respectively 10–40 parts of dry weight of latex A and 90–60 parts of dry weight of latex B. Particularly desirable improvements are obtained when the latices are mixed so as to provide weight proportions of 15–25 to 85–75 of the dry weights of latices A and B respectively. In usual practice, the latices will first be combined and then compounded as for a single latex.

The thus prepared latex blend may be combined with fibers, e.g. cellulosic fibers, asbestos, Fiberglas, by any of the conventional methods, shaped if necessary, dried and cured. They are particularly useful in preparing compositions for the production of coated paper. These compositions are aqueous pastes containing between 30 and 70% by weight of non-volatile materials such as fillers, adhesives such as starch and proteins e.g. casein and isolated soy protein, polymers, dispersants, buffers and defoamers. The compounding techniques, machinery and processes of paper coating are described in "Pigmented Coating Processes for Paper and Board" TAPPI Monograph Series No. 28 (1964). The filler is selected from one or more of the conventional fillers such as finely divided clays, calcium sulfo-aluminate, calcium carbonate, alumina, silica, titania, zinc oxide and colorants and is used in amounts from about 1 part to about 20 parts per part of uncompounded dry weight solids in the latex and forming preferably at least 60% by weight of the total non-volatile material. A suitable adhesive, e.g. starch is used in an amount of 3 to 30 parts dry weight basis per 100 parts filler. Proteins such as casein and soy protein can be used instead of or in addition to starch. An enzyme-converted starch is preferably used.

The compositions of this invention show excellent binding power and impart improved porosity to the coatings thereby providing this much sought-after combination of properties. If strength is of less concern or a greater strength is obtained than is needed the amount of latex in the coating composition may be reduced, which feature is valued in paper for web off-set printing. The improved porosity permits faster drying of the coated paper without the occurrence of blistering.

In this specification where the following tests of the coated paper art are referred to, they were performed as follows:

Pick resistance of coated papers

This test is a measure of the adhesion of the coating to paper and indicates the maximum speed at which the paper can be printed without breaking the coated surface. A calendered sheet of paper, conditioned for at least 4 hours at 21° C. and 50% relative humidity, is printed with an ink of known tack (I.P.I. No. 5) under a known pressure (35 kg./cm.$^2$) at different speeds in an I.G.T. (Instituut voor Grafische Techniek, Amsterdam, Netherlands) printability tester. The speed at which picking first occurs is the pick resistance value.

Ink absorbency of coated papers

This test provides a measure of the quantity of ink that is absorbed by the coated paper. A photoelectric testing meter is used to measure the brightness of the coated paper before and after inking with a standard ink applied in a manner well known in the art. The ink absorbency is expressed as the percentage loss in brightness.

Wet rub resistance of coated papers

This test measures the amount of the coating that is removed by wet brushing of the coated paper. A model 503 Taber abrader fitted with a rimmed sample holder and with a badger hair brush in place of the grinding wheel is used in this test. A piece of coated paper wetted with 10 mls. of water is brushed for a fixed length of time (e.g. 100 revolutions). The water is collected and then its light transmission is measured and compared to that of the reference water. The wet rub resistance is expressed as the percentage of light transmission.

Gurley Porosity

The description of this test is found in the TAPPI Test Method T–460, which was modified as used herein to the extent that a smaller volume (10 ccs.) of air was used since an alternate method of measuring the time interval to sufficient accuracy was made available.

Gloss

Determined according to TAPPI Test Method T48-0TS-6.5.

Illustration of the invention is provided by the following examples:

EXAMPLE I

A number of latex blends were prepared by mixing two latices, A and B, in the dry weight ratios of 10/90, 20/80, 30/70 and 40/60, respectively. The individual latices were identified by the following characteristics:

Latex A:

Polymeric composition (weight percent):
Butadiene _____ 20.5
Styrene _____ 77
Itaconic acid _____ 2.5
Latex solids, weight percent _____ 51
Emulsifier type _____ (1)
pH _____ 8.8

[1] Anionic, synthetic (sulfonated fatty acid).

Latex B:
  Polymeric composition (weight percent):
    Butadiene _____ 52
    Styrene _____ 45
    Acrylic acid _____ 0.5
    Itaconic acid _____ 1.0
    Acrolein _____ 1.5
  Latex solids, weight percent _____ 49.6
  Emulsifier type _____ (1)
  pH _____ 7.5

1 Anionic, synthetim (sulfosuccinate ester).

With each of the above latex blends a paper coating composition was prepared to a total solids of 60% by weight from the following formulation:

Parts by weight
Paper coating grade china clay _____ 85
Precipitated calcium carbonate _____ 15
Oxidized starch _____ 5
Latex _____ 12

The pH of each coating composition was adjusted to 8.8 and each was found to have satisfactory rheology properties when tested on a Hercules "Hi-Shear" rheometer. With each coating composition a coated paper was prepared by applying the composition to an uncoated paper substrate to a coat weight of 4 pounds per ream by means of a laboratory model coating device. After drying, the coated paper was subjected to testing, the results of which are shown in Table I.

Also prepared and tested was paper coated with a commercial paper-coating latex as a control. This latex had the following properties:

Polymer type—carboxylated butadiene/styrene copolymer (60% styrene)
Latex solids—50%
pH—9.0

The results of the experiment show that the coating composition of this invention provides a coated paper superior to that prepared with the control latex. The improved porosity is obtained while retaining an acceptably good level of resistance to "picking," while the control although having a good level of pick resistance had a poor Gurley porosity value.

TABLE I

|  | Experimental | | | | |
| --- | --- | --- | --- | --- | --- |
| Ratio | 10/90 | 20/80 | 30/70 | 40/60 | Control |
| Pick resistance, ft./min | 197 | 196 | 174 | 170 | 193 |
| Ink absorbency, percent loss | 19.7 | 22.1 | 21.5 | 20.3 | 18.4 |
| Wet rub resistance, percent | 97.5 | 98.0 | 96.0 | 96.5 | 96.0 |
| Gurley porosity, time (seconds) for 10 cc. of air to pass | 341 | 302 | 298 | 299 | 465 |
| Gloss, percent | 61.2 | 62.9 | 62.8 | 64.3 | 59.0 |

EXAMPLE II

Another latex similar to latex B of Example I was prepared but with the butadine/styrene ratio being 43/54. 80 parts of this latex (dry weight basis) was blended with 20 parts (dry weight basis) of latex A of Example I and compounded in the same way. This coating compound and the Control compound of Example I were applied to a paper substrate at a coating weight of 8 pounds per ream. The two coated papers were dried and tested as in Example I. The results are shown in Table II and clearly point to the superiority of the latex composition of this invention.

TABLE II

| Test | Experimental | Control |
| --- | --- | --- |
| Pick resistance, ft./min | 315 | 255 |
| Ink absorbency, percent loss | 18.8 | 13.9 |
| Wet rub resistance, percent | 93.0 | 93.0 |
| Gurley porosity, seconds | 580 | 931 |
| Gloss, percent | 58.5 | 57.0 |

EXAMPLE III

Another latex similar to latex B of Erample I was prepared but with the acrolein being omitted from the polymerization recipe. Two paper coating compositions were prepared according to the formulation given in Example I, the one coating utilizing the 20/80 ratio latex blend according to Example I, while the other coating utilizing a latex blend of 20 parts of latex A described in Example I and 80 parts of the present acrolein-free latex. Each of these coating compositons were applied to paper at a coating weight of 10 pounds per ream and the papers were then dried and tested as before. The results as recorded in Table III show clearly the better properties obtained when polymerized acrolein forms part of the molecular structure of the polymer in latex B, particularly in pick resistance and porosity.

TABLE III

| Test | Acrolein-containing polymer not in latex | Acrolein-containing polymer present in latex |
| --- | --- | --- |
| Pick resistance, ft./min | 387 | 426 |
| Ink absorbency, percent loss | 13.5 | 18.1 |
| Wet rub resistance, percent | 87.0 | 98.5 |
| Gurley porosity, seconds | 618 | 478 |
| Gloss, percent | 79.9 | 78.1 |

EXAMPLE IV

A coated paper was prepared using a 20/80 latex blend similar to that in Example I except that the latex A in the present example was prepared without the use of an unsaturated carboxylic acid monomer. The coating weight was 10 pounds per ream in the present example. The properties of the coated paper were compared with those obtained using a Control as in Example I also applied at 10 pounds per ream.

TABLE IV

| Test | Control | Invention |
| --- | --- | --- |
| Pick resistance, ft./min | 335 | 356 |
| Ink absorbency, percent loss | 12.3 | 16.0 |
| Wet rub resistance, percent | 95.5 | 95.0 |
| Gurley porosity, seconds | 850 | 397 |
| Gloss, percent | 75.1 | 77.2 |

These results demonstrate the improved properties obtained by means of the present invention.

What is claimed is:

1. A latex composition comprising a mixture of: (A) 10–40 parts on a dry weight basis of an aqueous latex of a copolymer prepared from a monomer mixture comprising (1) 30–15 weight percent of an acyclic conjugated diolefin monomer selected from butadiene-1,3, isoprene, chloroprene and 2,3-dimethylbutadiene-1,3, (2) 70–85 weight percent of a monoolefinically unsaturated copolymerizable monomer free of carbonyl structures selected from styrene, alpha-methyl styrene, alpha-chloro styrene and vinyl toluene and (3) 0–10 weight percent of an olefinically unsaturated carboxylic acid selected from the groups consisting of (a) unsaturated carboxylic acids containing 3–5 carbon atoms, (b) cinnamic acid, and (c) mixtures of (a) and (b); (B) 90–60 parts on a dry weight basis of an aqueous latex of a copolymer prepared from a monomer mixture comprising (1) 0.1–5 weight percent of an olefinically unsaturated carboxylic acid as defined in subsection (A)(3), (2) 0.1–5 weight percent of an olefinically unsaturated carbonyl compound selected from acrolein, alpha-methyl, beta-methyl and beta-phenyl acroleins, methyl vinyl ketone and mixtures thereof, (3) 90–99.8 weight percent of monomers composed of 60–30 parts of an acyclic conjugated diolefin monomer as defined in subsection (A)(1) and 40–70 parts of a monoolefinically unsaturated copolymerizable monomer free of carbonyl structures as defined in subsection (A)(2).

2. A latex composition as claimed in claim 1 wherein the acrylic conjugated diolefin monomer whereever referred to is butadiene-1,3.

3. A latex composition as claimed in claim 2 wherein the monoolefinically unsaturated copolymerizable monomer free of carbonyl structures whenever referred to is styrene.

4. A latex composition as claimed in claim 3 wherein the olefinically unsaturated carbonyl compound is acrolein.

5. A latex composition as claimed in claim 1 wherein the composition comprises a mixture of 15–25 parts of latex A and 85–75 parts of latex B and wherein the proportions of the monomers used in preparing these latices are as follows: (A)(1) is 25–20, (A)(2) is 75–80, (A)(3) is 1–5, (B)(1) is 1–3, (B)(2) is 1–3 and (B)(3) is 94–98.

6. A latex composition as claimed in claim 5 wherein the monomers used in preparing the latices are as follows: (A)(1) is butadiene-1,3, (A)(2) is styrene, (A)(3) is itaconic acid, (B)(1) is a mixture of acrylic and itaconic acids, (B)(2) is acrolein and (B)(3) is a mixture of butadiene-1,3 and styrene.

References Cited
UNITED STATES PATENTS
3,694,394  9/1972  Freeman _____ 260—29.7 W LEWIS T. JACOBS, Primary Examiner T. DeBENEDICTIS, Sr., Asistant Examiner U.S. Cl. X.R.

117—155 UA; 260—29.6 RB, 29.7 H, 29.7 UA, 29.7 W